United States Patent [19]
Lopata

[11] Patent Number: 5,471,915
[45] Date of Patent: Dec. 5, 1995

[54] SKEWER DRIVER FOR ROTISSERIE

[76] Inventor: Ira L. Lopata, 234 Eden Rd., Palm Beach, Fla. 33480

[21] Appl. No.: 347,923

[22] Filed: Dec. 1, 1994

[51] Int. Cl.⁶ .................................................. A47J 37/04
[52] U.S. Cl. ...................... 99/421 H; 99/419; 99/421 P; 99/444; 99/448
[58] Field of Search ................. 99/419–421 V, 99/532, 444, 449, 450, 482, 448; 126/41 B

[56] References Cited

U.S. PATENT DOCUMENTS

| | | | |
|---|---|---|---|
| 472,595 | 4/1892 | Wachs | 99/421 H |
| 652,660 | 6/1900 | Bradlee | 99/421 H |
| 2,245,220 | 6/1941 | Nelson | 99/421 H |
| 2,762,293 | 9/1956 | Boyajian | 99/421 P |
| 3,125,015 | 3/1964 | Schlaegel | 99/421 P |
| 3,196,776 | 7/1965 | Norton | 99/421 P |
| 3,744,403 | 7/1973 | Castronuovo | 99/421 V |
| 4,258,617 | 3/1981 | Akwei | 99/419 |
| 4,409,452 | 10/1983 | Oouchi et al. | 126/41 B |
| 4,985,607 | 1/1991 | Oya | 126/238 |
| 5,184,540 | 2/1993 | Riccio | 99/419 |
| 5,367,950 | 11/1994 | Sarich | 99/449 |

*Primary Examiner*—Timothy F. Simone
*Attorney, Agent, or Firm*—Norman Friedland

[57] ABSTRACT

An easy to clean and sanitize skewer driver for driving the horizontally supported skewer in the rotisserie oven for roasting chickens and other food products is formed from an outer and an inner sleeve where the inner sleeve is affixed to a planet gear and is journalled in the outer sleeve for rotary motion. A pin bisecting the inner sleeve retains the inner sleeve and planet gear and defines a recess or socket for accepting the end of and driving the skewer for rotation about its own axis. The outer sleeve is frictionally fitted to the reel plate to orbit in the rotisserie oven so that the skewer rotates with and relative to the reel plate.

8 Claims, 4 Drawing Sheets

SKEWER DRIVER FOR ROTISSERIE

CROSS REFERENCES

This invention relates to the subject matter disclosed in patent application Ser. No. 07/347,922, filed Dec. 1, 1994, now U.S. Pat. No. 5,445,064 filed on even date by the inventor common to this patent application and entitled "Skewer for Rotisserie" and in patent application Ser. No. 08/347,924, filed Dec. 1, 1994, now U.S. Pat. No. 5,445,065 filed on even date by the inventor common to this patent application and entitled "Self Centering Means of a Planetary System for a Rotisseri".

TECHNICAL FIELD

This invention relates to rotisseries for roasting chickens or the like and particularly to the skewer driver for driving the skewer around its own axis and mounted in a planetary gear system for orbiting the skewers in addition to the rotation thereof.

BACKGROUND ART

The advent of commercial rotisseries for cooking chickens and like foods has given impetus to certain design considerations that lend themselves to maintaining cleanliness, ease of operation, maintainability, efficiency and enhancing taste of the chicken. Examples of rotisseries that exemplify the commercial types of rotisseries that shares common concerns with the present invention are disclosed in U.S. Pat. No. 5,136,933 granted to Riccio on Feb. 9, 1993 entitled "Cooking Apparatus with Rotisserie and Reclamation Trap", U.S. Pat. No. 5,136,933 granted to Derakhshan on Aug. 11, 1992 and entitled "Rotary Orbital Rotisserie" and U.S. Pat. No. 4,214,516 granted to Friedl et al on Jul. 29, 1980 entitled "Barbecue Oven". In these prior art rotisseries the spit or skewer is rotated about its own axis and orbits about the rotisserie oven by virtue of spaced drums or reel plates that are mutually rotated and horizontally support the skewer for rotary motion. In each instance the skewer end is inserted in a driver that is attached to the reel plate and is connected to a planet gear that rotates the individual skewer. However, in each instance the mechanism driving the skewer is constructed in such a manner that the ability to clean and maintain it sanitary is difficult, if not impossible under current working standards in commercial environments.

As for example, the skewer driver in the U.S. Pat. No. 4,214,516, supra, includes a socket adapted to receive the end of the skewer which essentially is a recess that is closed on one end making it difficult to insert cleansing utensils to clean it thoroughly. In addition the skewer driver is complex requiring springs, seals, retaining rings and the like.

The U.S. Pat. No. 5,136,933, supra, likewise requires springs and a round socket on one end and a square socket on the other. This likewise is difficult to cleanse not only because of the crevices incidental to the helical spring but also because sharp corners tend to collect food particles.

A problem incidental to rotisseries, particularly of the type that operate in the high temperature range, is that the fat of the chicken that melts in the cooking process scatters in all directions and has the propensity of migrating into the skewer driver which is in close proximity to the cooking foods. The problem becomes more acerbated if the individual components are designed so that they capture and retain food particles that are hard to get at and the components are difficult to disassemble or awkward to handle.

I have found that I can obviate the cleansing problem by fabricating the skewer driver such that the stub shaft and planet gear components are easily removed as a small unit from the reel plate to be cleaned independently, is easy to handle, and contains no crevices or sharp corners. Additionally, the skewer driver of this invention is rugged and includes a self contained low friction journal bearing and provides the necessary support to the skewer so that its spacial position relative to the burner is constant which is important for even cooking in these high temperature rotisseries.

SUMMARY OF THE INVENTION

An object of this invention is to provide an improved skewer driver for the skewer of a rotisserie.

A feature of this invention is an outer sleeve having an outer surface adapted to frictionally fit into an aperture in the reel plate to be orbitally rotated thereby. A journal bearing made from a composite or synthetic low friction material is frictionally fitted internally into the outer sleeve and rotatably supporting an inner sleeve defining a stub shaft having one end extending through the outer sleeve rigidly attached to the center of a planet gear. The opposite end of the inner sleeve is bisected by a pin that serves the dual purpose of retaining the stub shaft and accepting the end of the skewer to be driven by the planet gear for rotating about the skewer axis.

The foregoing and other features of the present invention will become more apparent from the following description and accompanying drawings.

DETAILED DESCRIPTION OF THE PREFERRED EMBODIMENT

Figures 1, 1A:
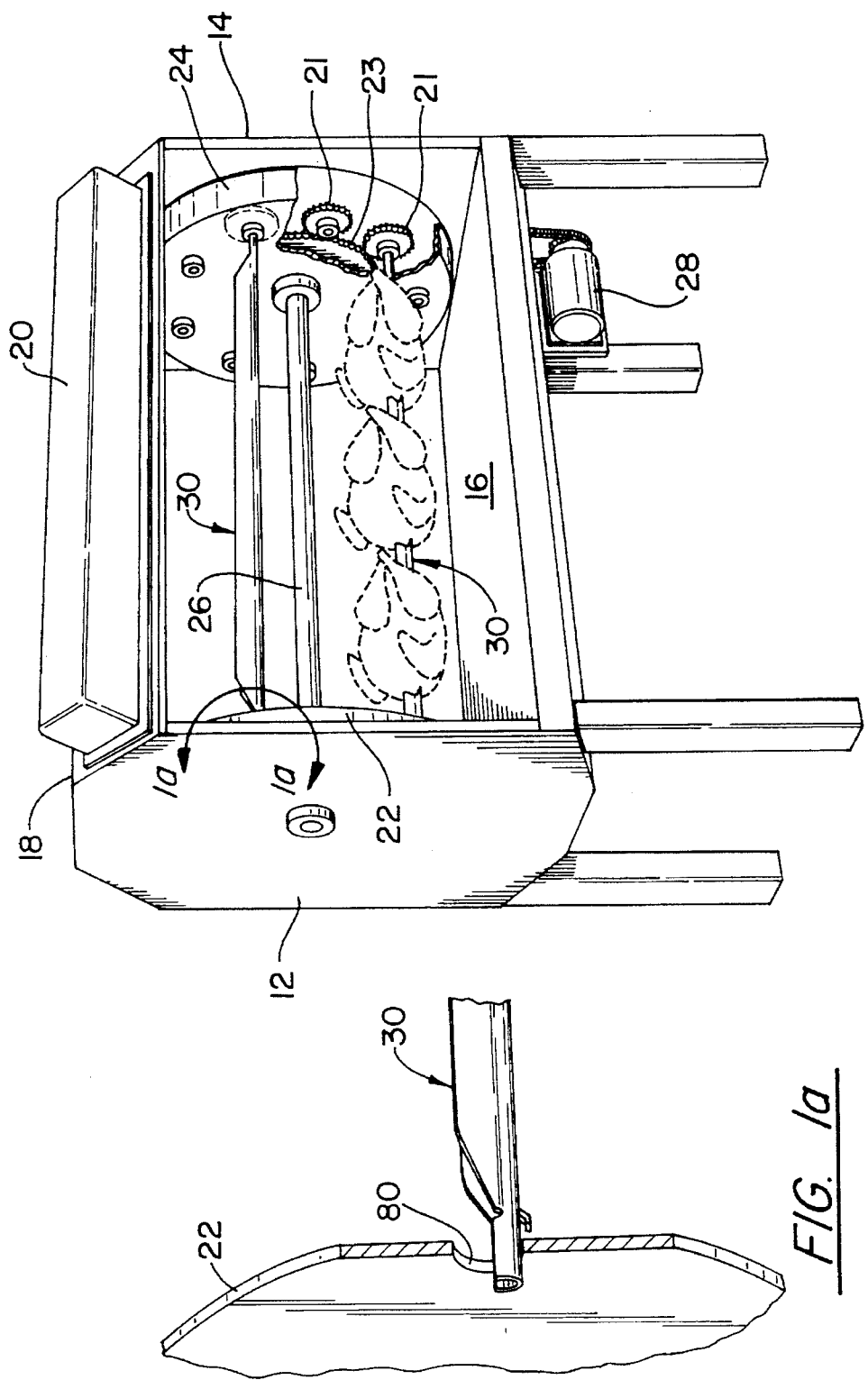
FIG. 1 is a schematic view in perspective illustrating the rotisserie with two skewers mounted therein.
FIG. 1A is a partial view partly in section and partly in elevation illustrating the skewer end and bearing attachment.

While in its preferred embodiment the skewer driver of this invention is being described in conjunction with a commercial type of rotisserie, as one skilled in this art will appreciate, this skewer driver has utility for other types of rotisseries and including, but not limited to residential types of rotisseries. Additionally, it will be appreciated that in certain commercial rotisseries, double ovens with like amount of skewers and skewer drivers are mounted in side-to-side relationship. Additionally, as one skilled in this art will appreciate the recess or socket in the skewer driver may be adapted to accommodate skewers other than the one described as the preferred embodiment.

Reference is now being made to FIGS. 1–4 which disclose in detail the construction of the skewer driver. First, looking at FIG. 1 which is a schematic view of the rotisserie and the skewer, it will be noted that the rotisserie is an open type of oven generally indicated by reference numeral 10, having the opposite side walls 12 and 14, bottom wall 16 and the top wall 16 supported to legs. Fitted to the top wall is a gas fired heater 20 of the type that generates substantially 1600 degrees fahrenheit that is mounted on a bias in the front end of the oven. A suitable heater is described in U.S. Pat. No. 4,927,355 granted to Haire et al on May 22, 1990 and entitled "Burner Assembly". A pair of rotating drums or reel plates 22 and 24 axially spaced relative to each other are supported to shaft 26 that is journalled in the bearings (not shown) supported in the apertures and formed in the side walls 12 and 14 for mutual rotary motion. A suitable electric motor 28 and belt or chain are suitably connected to a drive pulley or sprocket gear for imparting continuous rotary motion to reel plates 22 and 24. A plurality of planet gears 21 rotatably supported to the reel plate 24 mesh with the bull or sun gear 23 that is suitably restrained from rotating by side wall 14. As the reel plates 22 and 24 rotate by virtue of the motor 28 about central axis of shaft 26, the individual planet gears meshing with the teeth of sun gear or bull gear 23, rotate relative to the reel plates 22 and 24 causing the chickens to rotate in the cooking compartment of the rotisserie and rotate about the skewers that rotate relative to the reel plates. In this construction a different portion of the chickens face the heater 20 and its full intensity for each revolution until a full cycle, which say, may be every five revolutions of the reel plates, is attained. This not only effectuates even roasting, but also prevents overcooking any one portion of the chicken.

Figure 2:
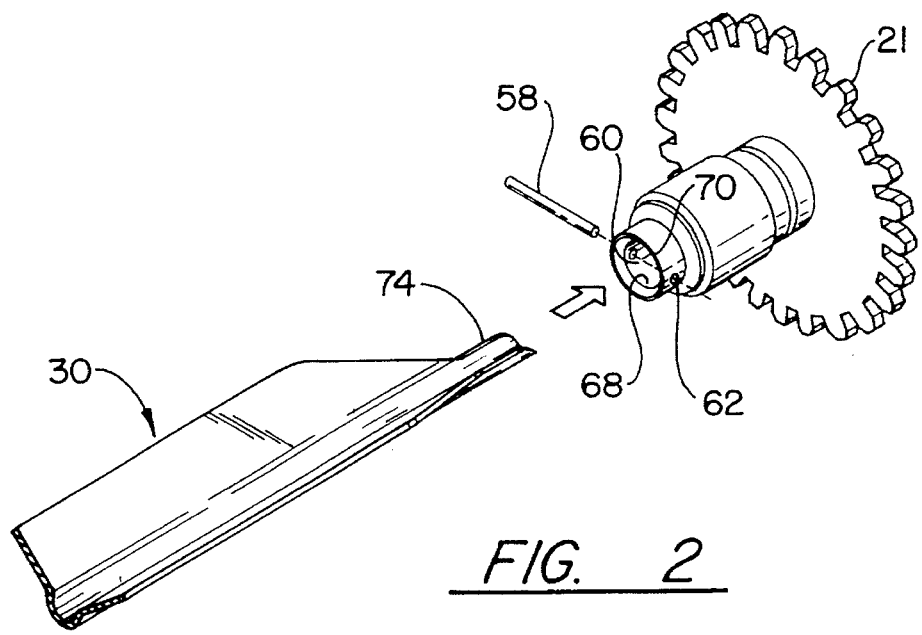
FIG. 2 is an exploded view in perspective illustrating the drive end of the skewer and the skewer driver of this invention.
Figure 3:
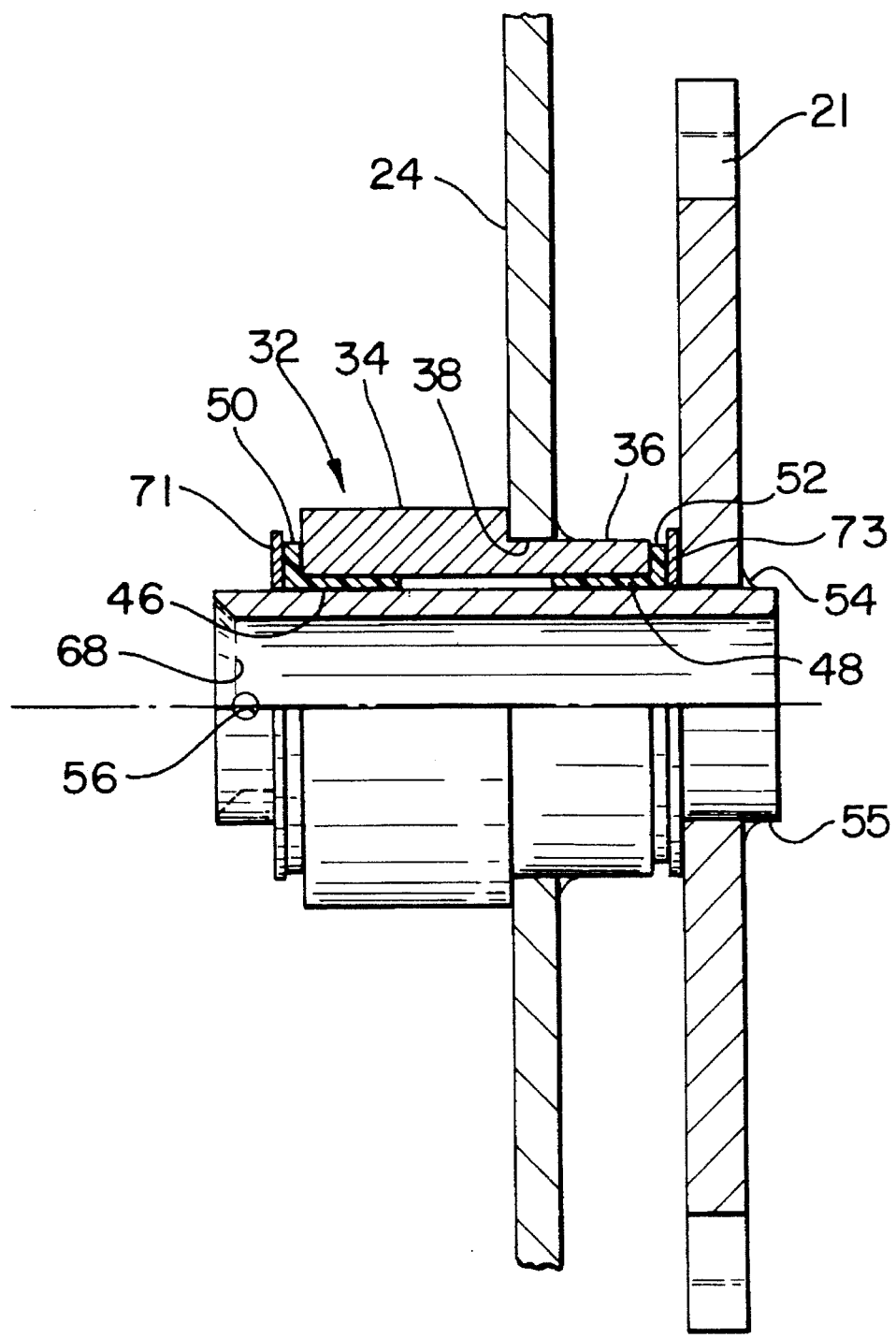
FIG. 3 is a partial view partly in elevation and partly in section illustrating the skewer driver of FIG. 2 mounted to the reel plate of the rotisserie.
Figure 4:
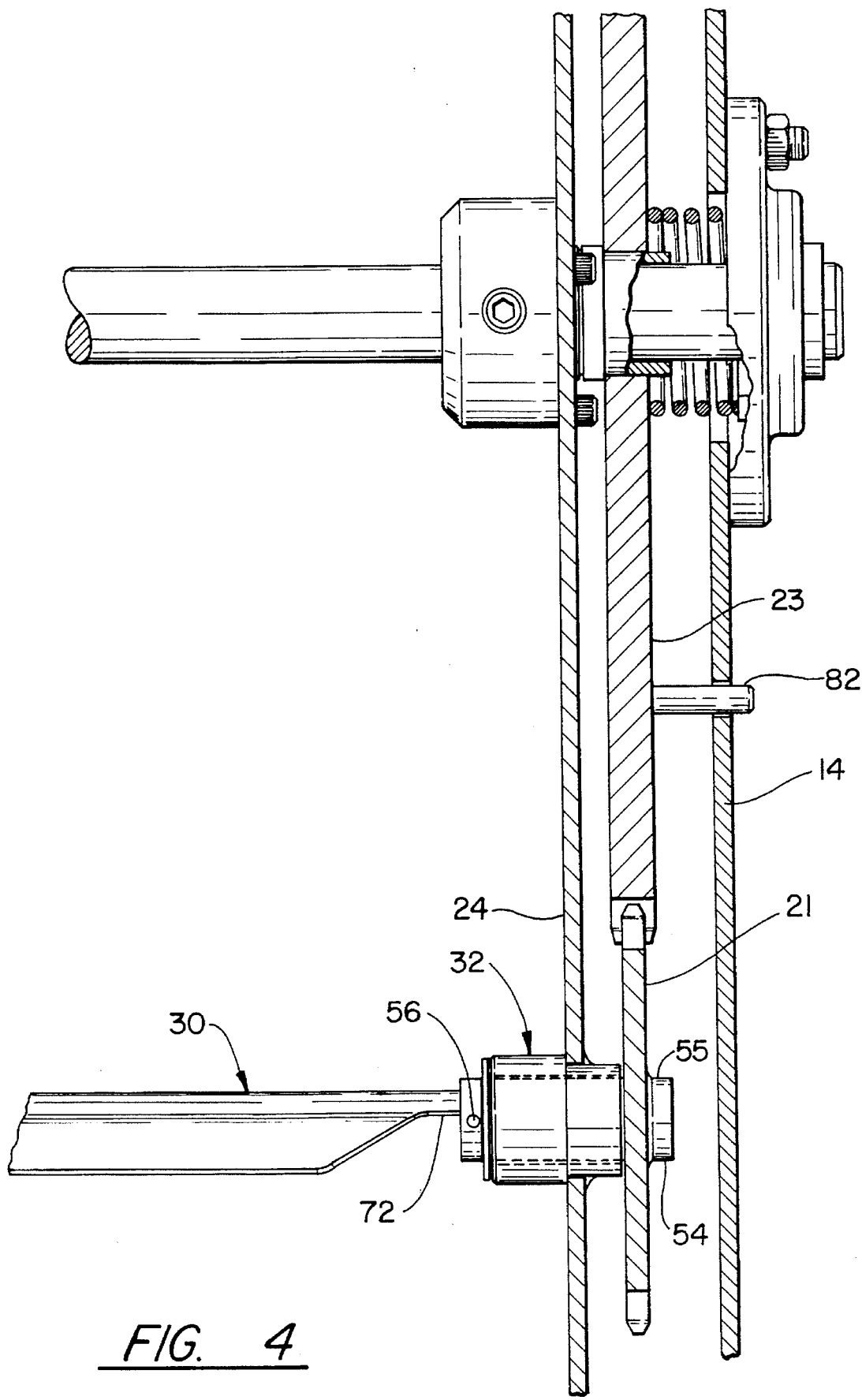
FIG. 4 is a partial view partly in elevation and partly in section illustrating the skewer driver and planetary gear system.

The skewer driver 32 as best seen in FIGS. 2–4 comprises an outer sleeve 34 fitted into an aperture 38 formed in reel plate 24 and attached thereto by any suitable means, say welding, and rotatable with the reel plate 24 for orbital motion. An annular portion 44 of the outer surface of outer sleeve 34 may be knurled so that it forms a tight fit into aperture 38 and prevented from rotating relative to the reel plate 24. A pair of suitable annular journal bearings 46 and 48 formed from a synthetic or composite material that exhibits a low coefficient of friction and doesn't require lubrication is forced fitted in the inner diameter of outer sleeve 34. Obviously a single journal bearing could be utilized instead of the two juxtaposed journal bearings. Each end of the bearings 46 and 48 may be formed into flanges 50 and 52, respectively so as to extend beyond the ends of outer sleeve 34 for proper spacing and ease of rotation. Stub shaft 54 fits into the outer sleeve 34 and is rotary supported by the journal bearings 46 and 48 to rotate about its central axis. One end of stub shaft extending through reel plate 24 is affixed to the central portion of planet gear 21, say by welding or brazing and rotates therewith. The other end of stub shaft extending on the other end of reel plate 24 is adapted to receive the driving end of the skewer 30 which will be described in more detail immediately hereinbelow.

As noted the stub shaft 54 is a sleeve with a straight through central bore 56. The pin 58 is mounted in diametrically opposed holes 60 and 62 formed at the end of stub shaft 54 remote from planet gear 21. The diameter of hole 60 is slightly larger than the diameter of hole 62 so that the pin easily fits into hole 60 and is frictionally fitted into hole 62 so as to retain the pin. For disassembly, the pin is simply knocked out of hole 62 by any suitable means or manner. The pin holds the stub shaft and planet gear in place and fits transversely into bore 56 to bisect it and form a pair of opposing sockets or recesses 68 and 70 each of which serves to accept the driving end of the skewer 30. A pair of suitable washers 71 and 73 that serve as spacers may be mounted on either end of sleeve 34 and flanges 50 and 52 (see FIG. 3).

In accordance with this invention the end portion 55 of stub shaft 54 extends beyond the front face of planet gear 21 to assure that the melting fat from the chicken doesn't collect on the front face of planet gear 21 and migrate toward the teeth of the planet gear and flow on the back side of the planet gear. As mentioned in the foregoing the stub shaft 54 includes the straight through central bore 56 which serves to flow the liquid fat therethrough and drip off of thinned portion 55 away from the face of the planet gear and collected in a drip pan located in the bottom of the oven.

Figure 5:
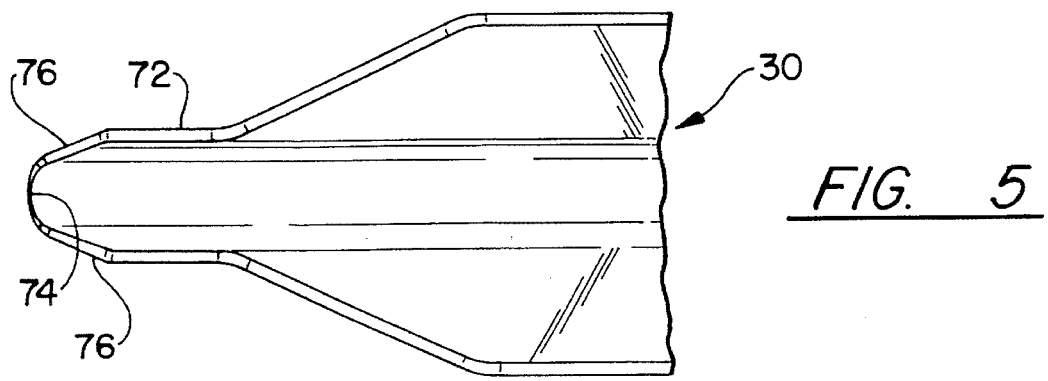
FIG. 5 is a partial view in elevation showing the driver end of the skewer.

As noted in FIG. 5 which is a partial view of the skewer 30 showing the details of the driving end 72, the tip of the end 72 is tapered from the end of the spine portion 74 toward the aft end to form a pair of tapered surfaces 76. The end 72 is inserted in recess 68 or 70 and bears against the pin 58. Hence the pin has the dual function of retaining the stub shaft and planet gear 21 and driving the skewer 30 for rotation about its own axis.

Figure 6:
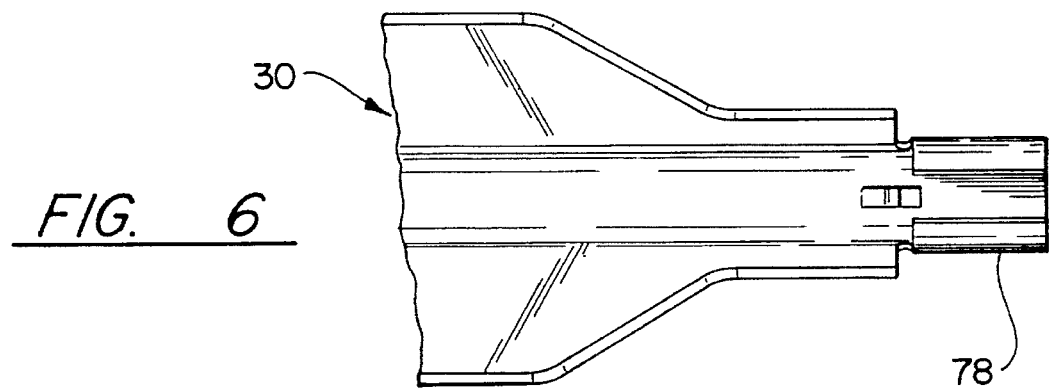
FIG. 6 is a partial view in elevation showing the opposite end of the skewer that fits into the other reel plate of the rotisserie.

The opposite end of skewer 30 as shown in FIGS. 1A and 6 is configured to define the stub shaft 78 that fits into an aperture 80 formed in the mutually rotating reel plate 22 for horizontally supporting skewer 30.

As noted in FIG. 4 the planet gear 21 extending from the face of reel plate 24 opposite the face from which the skewer driver 32 extends meshes with the bull or sun gear 23 held stationary by pin 82 supported to wall 14. In operation, the reel plate 24 driven by the motor 28 orbits in the rotisserie oven and the planet gears 21 are rotated by virtue of the meshing teeth of the planet and bull gears to rotate the skewer driver 32 and skewer 30 about their own rotating axes, thus the chicken rotates with and relative to the reel plates.

From the foregoing it is apparent that the skewer driver 32 is a relatively small and compact bushing that is easily cleaned and is free from crevices and corners that are susceptible of collecting and retaining food particles. It is easy to disassemble, requiring merely the removal of pin 56. The socket end lends itself for the easy insertion of the skewer and the unit is sufficiently rugged to hold the skewer in a constant spacial relationship for even roasting of the chicken.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a rotisserie for roasting chickens or other food products of the type that includes axially spaced reel plates and a planetary gear system, said rotisserie including skewer driving means comprising an outer sleeve affixed to the reel plate and rotating therewith, a stub shaft having a central bore supported to said outer sleeve for rotary motion, a planet gear affixed to one end of said stub shaft extending on one face of said reel plate, a pin extending through the central bore of said stub shaft bisecting said bore for defining a socket for receiving the driving end of the skewer and being affixed to diametrically formed holes at the end of said stub shaft extending on the opposite face of said reel plate, said stub shaft and planet gear being rotatable with said reel plate whereby the end of the skewer fits into said socket and engages said pin to be rotated with the rotation of said skewer driving means and relative to said outer sleeve.

2. For a rotisserie for roasting chickens or other food products as claimed in claim 1 wherein said outer sleeve having an inner diameter, said skewer driving means including at least one journal bearing insert affixed to said inner diameter of said outer sleeve for rotary supporting said stub shaft.

3. For a rotisserie for roasting chickens or other food products as claimed in claim 2 including another journal bearing insert affixed to the inner diameter of said outer sleeve and in juxtaposition with said one journal bearing insert.

4. For a rotisserie for roasting chickens or other food products as claimed in claim 3 wherein said one journal bearing insert and said another bearing insert including a pair of end flanges each of which extend beyond the opposite ends of said outer sleeve.

5. For a rotisserie for roasting chickens or other food products as claimed in claim 4 wherein said inner sleeve extends beyond the planet gear.

6. For a rotisserie for roasting chickens or other food products as claimed in claim 5 including a pair of washers mounted at the ends of said pair of end flanges.

7. For a rotisserie for roasting chickens or other food products as claimed in claim 6 wherein one of said diametrically spaced holes forms a tight fit with said pin.

8. For a rotisserie for roasting chickens or other food products as claimed in claim 7 wherein said stub shaft is open ended to define a passageway for flowing liquid fat away from said planetary gear system.

* * * * *